(12) United States Patent
Frederick et al.

(10) Patent No.: US 8,051,390 B2
(45) Date of Patent: Nov. 1, 2011

(54) COMPENSATING FOR NON-UNIFORM BOUNDARY CONDITIONS IN STANDARD CELLS

(75) Inventors: Marlin Wayne Frederick, Austin, TX (US); David Paul Clark, Georgetown, TX (US)

(73) Assignee: ARM Limited, Cambridge (GB)

( * ) Notice: Subject to any disclaimer, the term of this patent is extended or adjusted under 35 U.S.C. 154(b) by 441 days.

(21) Appl. No.: 12/285,515

(22) Filed: Oct. 7, 2008

(65) Prior Publication Data
US 2010/0088659 A1    Apr. 8, 2010

(51) Int. Cl.
*G06F 17/50* (2006.01)

(52) U.S. Cl. ........... 716/54; 716/50; 716/51; 716/52; 716/53; 716/55; 716/139; 430/5; 430/30

(58) Field of Classification Search .......... 716/50–55, 716/139; 430/5, 30
See application file for complete search history.

(56) References Cited

U.S. PATENT DOCUMENTS

| | | | |
|---|---|---|---|
| 6,163,877 A * | 12/2000 | Gupta | 716/55 |
| 6,595,211 B2 * | 7/2003 | Weiler et al. | 128/204.18 |
| 2008/0250383 A1 * | 10/2008 | Tanaka et al. | 716/21 |

* cited by examiner

*Primary Examiner* — Nghia Doan
(74) *Attorney, Agent, or Firm* — Nixon & Vanderhye P.C.

(57) ABSTRACT

A method of design of a standard cell and a standard cell is disclosed. The method design comprising the steps of: identifying a non-uniformity in a boundary condition of said standard cell that would affect a characteristic of a neighbouring standard cell; introducing a further non-uniformity into said cell to mitigate the effect of said identified non-uniform boundary condition on said characteristic of said neighbouring standard cell.

31 Claims, 9 Drawing Sheets

EXAMPLE OF PLACEMENT OF UNIFORM AND NON-UNIFORM STRUCTURES TOGETHER

COMPENSATING FOR NON-UNIFORM BOUNDARY CONDITIONS IN STANDARD CELLS

BACKGROUND OF THE INVENTION

1. Field of the Invention

The field of the invention relates to the field of standard cells and their design, and in particular to addressing non-uniform boundary conditions in such cells.

2. Description of the Prior Art

In the design of semiconductor integrated circuits, circuit designers commonly use what are known as standard cells to achieve a particular logical function. Standard cells are essentially pre-designed layouts of transistors that are wired to perform a certain type of logical function. They are designed such that their boundary conditions are standard so that they can interact with each other in a manufacturable way and thus, any standard cell can be placed on any placement site in a standard cell block. In this way a designer can position the standard cells required for a system in any appropriate placement site without needing to worry about interactions with a neighbouring cell.

As standard cells are getting smaller in the portion of the standard cell area that has to be carefully controlled to insure manufacturability has grown to the point where many designs now depend upon strict uniformity to insure manufacturability. This has lead to an increase in the cell size and greater inefficiencies in the cell.

It would be desirable to produce standard cells that are compatible with each other such that they can be placed at any standard cell placement site, next to any other standard cell, even when these standard cells have a reduced area allowed by less uniformity at the boundaries.

SUMMARY OF THE INVENTION

A first aspect of the present invention provides a method of design of a standard cell comprising the steps of: identifying a non-uniformity in a boundary condition of said standard cell that would affect a characteristic of a neighbouring standard cell; introducing a further non-uniformity into said cell to mitigate the effect of said identified non-uniform boundary condition on said characteristic of said neighbouring standard cell.

The present invention recognises that with ever decreasing sizes of standard cells, it is becoming more and more difficult to generate high density standard cells with uniform boundary conditions. The tradeoff is that non-uniform boundary condition standard cells impact the characteristics of neighbouring cells. By characteristics things such as electrical performance and yield are included. Yield may be affected where the features are difficult to print due to the non-uniform boundary conditions.

The present invention addresses this problem by, rather than making every effort to remove an identified non-uniformity from the boundary conditions of the cells, it introduces a further non-uniformity, the further non-uniformity being designed to reduce or even eliminate the effect of the original non-uniform boundary condition on the neighbouring cell. Thus, this non-uniformity is introduced not to affect a characteristic of the cell it is part of but rather to affect the characteristics of a neighbouring cell. This radically increases the number of ways of dealing with non-uniform boundary conditions within a standard cell.

For example, if the characteristic affected is yield, the introduction of the further non-uniform boundary condition may make the pattern that forms the neighbouring cell easier to print accurately thereby making it more robust and the neighbouring cell less likely to fail.

Although the further non-uniformity may be within the cell in some embodiments said further non-uniformity extends over said cell boundary of said cell.

In the design of standard cells, each cell is designed to perform a function in isolation of the cells around it, and each cell has circuit elements within a boundary such that the cell can be located in a standard cell placement site alongside any other standard cell. It should be noted though that certain aspects of standard cells such as supply distribution structures may be shared between cells. However, these structures are also generally designed to be uniform on the boundary and they are shared structures for the benefit of each cell they contact, they are not present on one cell simply to benefit a neighbouring cell. It should be noted that legal placement sites for standard cells are sites that are aligned in rows and have quantized placement units that depend on the size of the placement grid.

The present invention, however, addresses the problem of non-uniform boundary conditions by designing in further non-uniformities and it realises that as these are to compensate for the effect of the first non-uniformity on a neighbouring cell then the normal rules for not violating cell boundaries do not necessarily hold and it is possible to allow these non-uniformities to extend across cell boundaries and thereby actually enter neighbouring cells. By allowing this to occur the number of ways of addressing the non-uniformity and the effect these solutions can have on the neighbouring cell are both greatly increased.

In some embodiments said further non-uniformity does not change a logical function of said standard cell.

The introduced further non uniformity is introduced simply to mitigate the effect of the other non-uniform boundary condition on a neighbouring cell and not to perform a function for the cell in question.

Although the standard cell could be formed in a number of ways in some embodiments said standard cell comprises a circuit formed from layers on a substrate and manufacture of said standard cell comprises patterning techniques, in which at least one mask is used to generate in a respective layer, patterns required to produce said circuit of said standard cell.

Forming standard cells from layers on a substrate using patterning techniques and masks is a common way of forming these cells.

In some embodiments, said patterns include a plurality of parallel strips formed from one of said layers, at least some of said strips being arranged to extend to a predetermined distance from one boundary of said standard cell, said step of identifying said non-uniformity comprising identifying at least one shorter strip that does not extend as far as said predetermined distance, and said step of introducing said further non-uniformity comprising introducing at least one additional strip at a position corresponding to said at least one shorter strip such that there is a gap between said at least one shorter strip and said at least one additional strip and said at least one additional strip extends beyond said predetermined distance.

Many standard cells are formed of patterns that include parallel strips each extending to a predetermined distance from a boundary of the cells. It should be noted that strips are generally elongated shapes but may in many embodiments be collinear rectangles. If any of these strips do not extend to this predetermined uniform distance then this is a non-uniformity at the cell boundary and this will effect the characteristics of a neighbouring cell. Embodiments of the present invention introduce a further non-uniformity by adding an additional strip at the position corresponding to the shorter strip, the additional strip extending beyond the predetermined distance. It has been found that this additional strip compensates at least partially for the effect the shorter strip has on the neighbouring cell.

Although the strip may not extend across the cell boundary, in many embodiments said at least one additional strip extends across said boundary of said cell.

As noted above the conventional rules of not allowing features that are part of one cell (as opposed to shared features such as supply distribution features) extend across a boundary into another cell do not need to be followed with the present technique and in this case it is found advantageous, where a shorter strip affects the characteristics of the corresponding strip in a neighbouring cell to extend an additional strip across the cell boundary into this neighbouring cell such that it compensates for the effect of the shorter strip.

In some embodiments said pattern includes a plurality of parallel strips formed from one of said layers, said strips being arranged in a substantially uniform pattern, said uniform pattern comprising a plurality of strips located at a same distance from each other and extending to a predetermined distance from one boundary of said standard cell, said substantially uniform pattern comprising at least one gap in said uniform pattern at said predetermined distance from said one boundary, said step of introducing said further non-uniformity comprising introducing at least one additional strip at a position corresponding to said at least one gap, said at least one additional strip extending beyond said predetermined distance.

In many standard cells the parallel strips may form a uniform pattern each a predetermined distance apart. If there is a break in this uniform pattern so that either one of these strips is absent or one of these strips is shorter then this causes a non-uniform boundary condition and again this can be mitigated by introducing an additional strip at this location that extends beyond the predetermined distance and possibly in some embodiments across the boundary of these standard cells. It should be noted that this additional strip may be formed to extend from within the predetermined distance across it to beyond it, or it may start beyond the predetermined distance and extend towards and perhaps across the cell boundary.

Although the standard cells may be formed in a number of ways, in some cases they are formed by a method of manufacture that comprises a double patterning technique involving the use of two masks to make one of said layers on said substrate.

As sizes of standard cells are getting smaller it is becoming more difficult to accurately print the shapes required. Thus, rather than using a single mask it has been found advantageous to use two masks to achieve these shapes. A first mask may be used for drawing layers with the second mask being used to cut them which produce more accurate shapes as it is generally easier to cut more accurately than it is to draw.

Alternatively, the two masks may be used for drawing, the masks having different shapes and being used to generate different patterns, the combination of which forms the desired pattern.

Although the layers that are patterned in this way may be formed of a number of things, in some embodiments they are polysilicon gate layers while in other embodiments they may be metallisation diffusion, contact or via layers.

Although the step of introducing the further non-uniformity into the cell can be done in a number of ways, in some embodiments it comprises adding structure to the cell to mitigate its effect on the neighbouring cell.

In some embodiments said step of introducing said further non-uniformity does not substantially affect a characteristic of said cell. In this respect there is no change in the structure of the cell as it relates to that cell's function, the change in structure is made to affect the neighbouring cell.

The further non-uniformity is introduced not to affect the characteristics of the cell it is added to, but is added rather to affect how a neighbouring cell reacts to the non-uniformity in this cell. Thus, in many embodiments this further non-uniformity does not substantially affect the characteristic of the cell to which it is added.

A second aspect of the present invention provides the standard cell generated from a design according to a first aspect of the present invention.

A third aspect of the present invention provides a standard cell comprising at least two features each generating non-uniform boundary conditions, at least one of said non-uniform boundary conditions mitigating an effect on a neighbouring standard cell of at least one other of said at least two non-uniform boundary conditions.

A fourth aspect of the present invention provides an integrated circuit comprising a plurality of standard cells arranged in standard cell placement sites to form a logical system, at least one of said standard cells comprising a standard cell according to a third aspect of the present invention.

The standard cells are placed in placement sites and are linked together to form a logical system, which may be a processing system or it may be a control system.

A fifth aspect of the present invention provides computer program code comprising a physical representation of a logical function of said standard cell according to a third aspect of the present invention.

A sixth aspect of the present invention provides a method of design of an integrated circuit comprising a plurality of standard cells comprising the steps of: arranging said plurality of standard cells in placement sites, and arranging connecting circuitry to connect them; identifying a non-uniformity in a boundary condition of at least one of said standard cells that affects a characteristic of a neighbouring standard cell; introducing a further non-uniformity into said cell to mitigate the effect of said identified non-uniform boundary condition on said characteristic of said neighbouring standard cell.

Although in the earlier aspects of the present invention the non-uniformity in a boundary condition of a standard cell is identified for that cell in isolation and a correcting further non-uniformity added, in this aspect the cell is analysed post placement in an integrated circuit and an additional step is then performed to add the further non-uniformity to correct for the identified non-uniformity's effect on a neighbouring cell. A potential disadvantage of performing this step post placement is that it is not part of the design of the standard cell itself and can have unforeseen effects on its characteristics. Furthermore, it adds a post placement step to the design procedure. However, it can be an effective way of addressing the problem of non-uniformities in boundary conditions.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
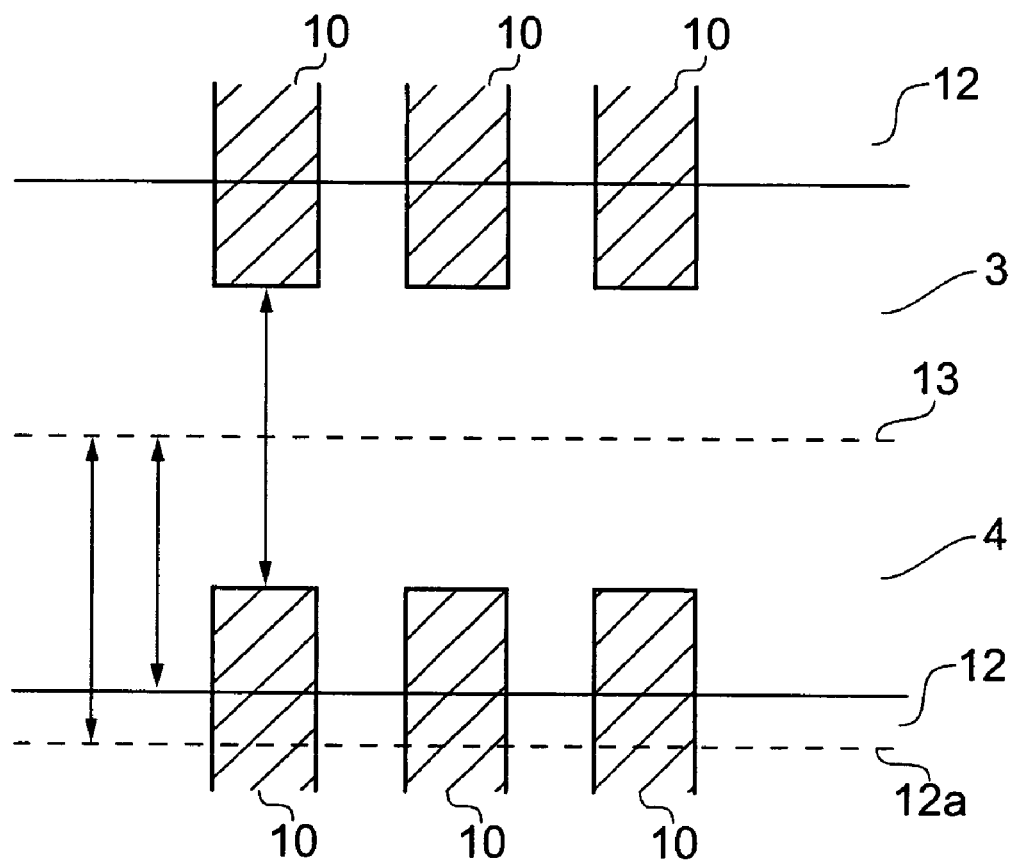
FIG. 1 schematically shows a uniform boundary between conventional standard cells.

FIG. 1 schematically shows a portion of the boundary between two conventional standard cells 2 and 4. Each of these two standard cells comprise polysilicon gate (poly) strips 10 which extend out of the diffusion layer 12 toward the boundary 13 between the two cells. According to typical design rules, the closer these strips are allowed to get to the boundary 13 the more diffusion layer area and hence active device area there is within the cell. However, there are design rules which limit the minimum distance allowable between the ends of the poly strips 10 and the edge of the cells, for the cases such as shown in FIG. 1 where adjacent cells also contain poly shapes near the boundary. These rules are there to allow manufacturable printing of the intended space between the poly strips in adjacent cells, and also because when printing such strips there is some degree of "pull back at the ends" which means the edges are not the accurate rectangles they appear. This pull back is due to lithographic limitations and has historically been reduced by post-processing of the designed shapes after the design has been created but before the mask is made, in order to counteract such lithographic limitations. In order to improve the accuracy of the shape the strips a more recent technique of implementing them is by drawing them contiguously in poly and then cutting them to get a more exact shape. However, the cutting step may bloom and result in excessive cuts of some poly shapes such that the desired shape may not be accurately achieved. For these reasons there are design rules to limit minimum distances that the poly strips can extend over the end of the diffusion layer (known as the poly end cap). These design rules typically vary depending on whether or not there is a corresponding poly strip in the neighbouring cell. Where there is not a corresponding poly strip the design rules are more restrictive and require a larger poly end cap.

Figure 2:
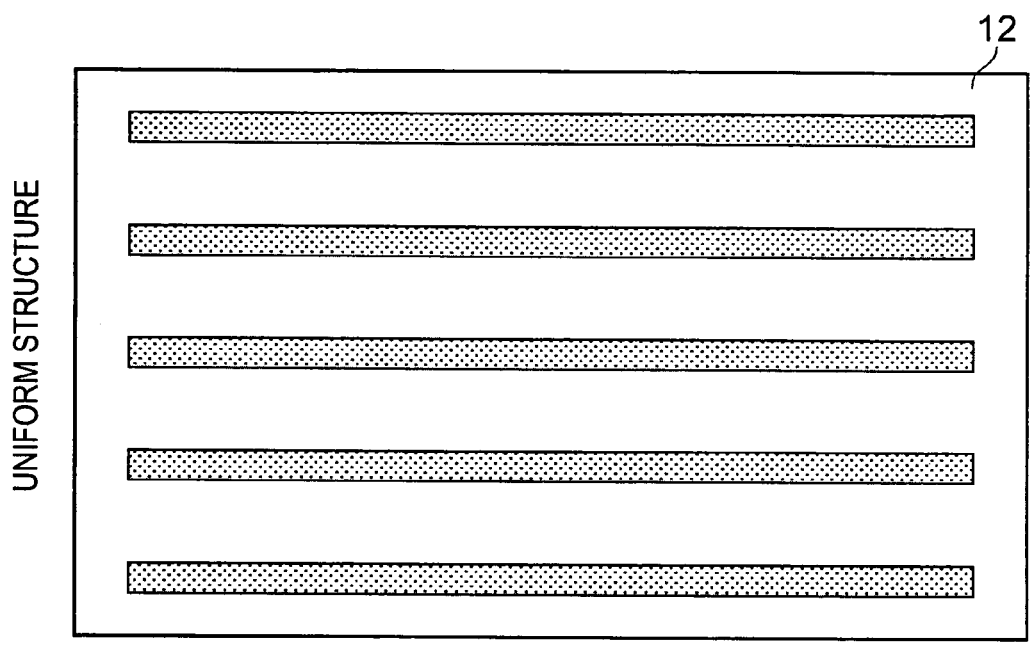
FIG. 2 schematically shows a uniform structure within a conventional standard cell.

FIG. 2 shows a standard cell 12 having a uniform structure with a plurality of uniform poly strips each extending to a predetermined distance from the cell boundary.

Figure 3:
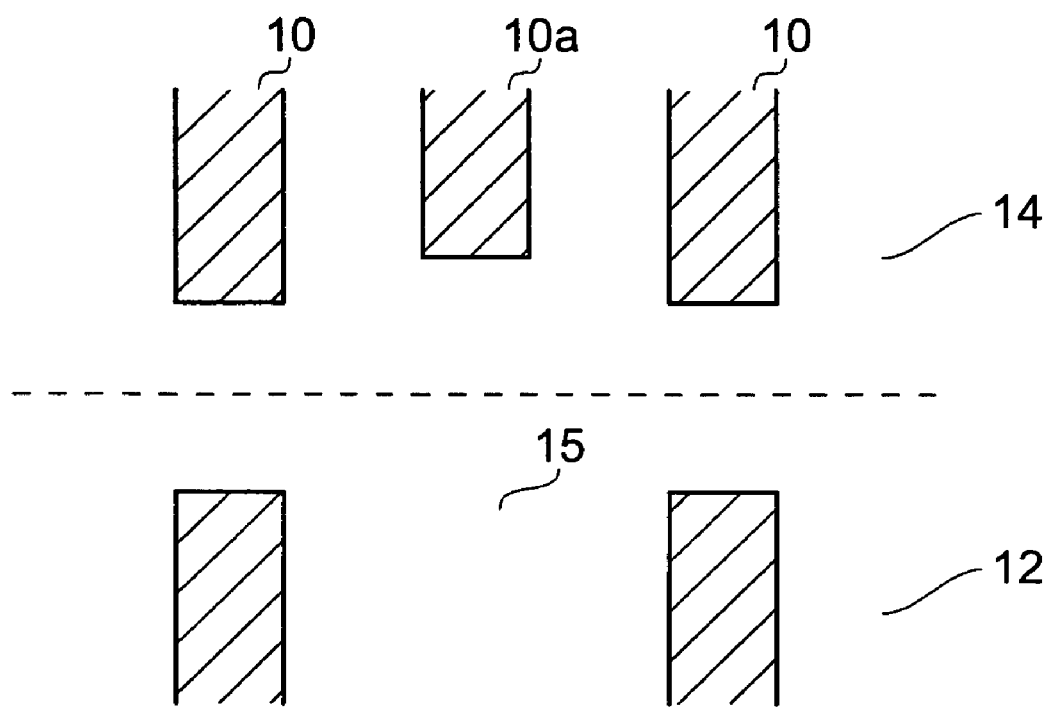
FIG. 3 shows a non-uniformity in a boundary condition of a standard cell and its effect on a neighbouring cell

FIG. 3 shows a conventional standard cell 12 having a non-uniformity 15 in its boundary condition in that one of the poly strips 10 is missing towards the edge. This may be due to the fact that this is a shorter poly strip, or it may be that there is no poly strip in this location. One method to form these shapes is to double pattern with a mask and cut mask. Since the cut mask is much larger in the region associated with the missing or short poly it is susceptible to blooming which would cut the strip 10a on the neighbouring cell 14, such that it is shorter than it should be. Thus, the non-uniformity in the boundary condition of cell 12 has produced a corresponding non-uniformity in the neighbouring cell 14.

Figure 4:
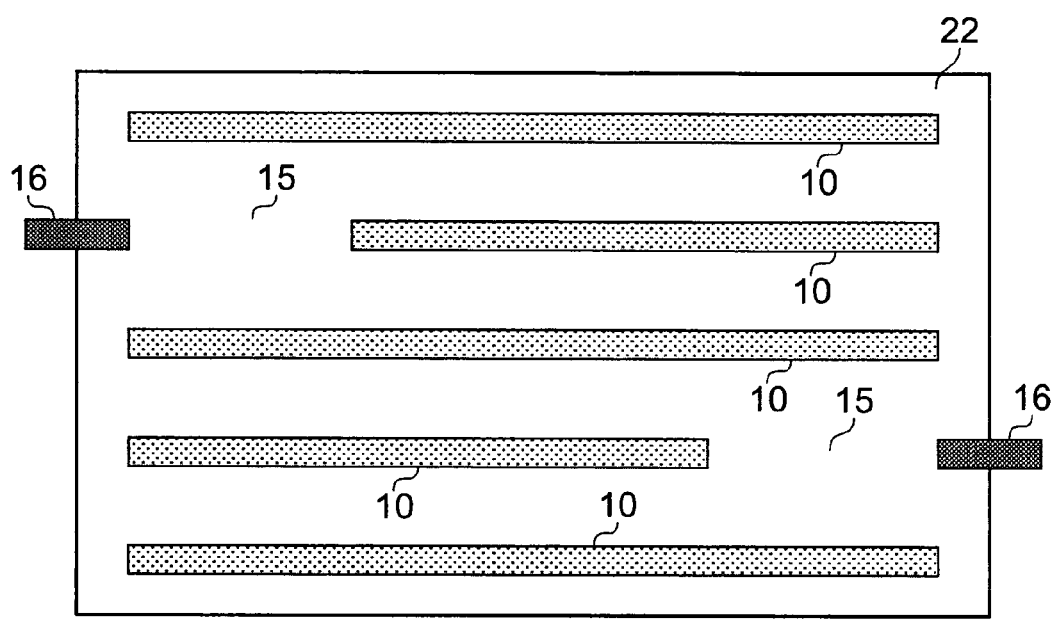
FIG. 4 shows a standard cell according to an embodiment of the present invention.

FIG. 4 shows a standard cell 22 according to an embodiment of the present invention in which two non-uniformities 15 in the boundary conditions of the cell are present due to short poly strips and two additional non-uniformities 16 have been added in order to compensate for the non-uniform boundary conditions.

This additional non-uniform feature is an additional poly strip 16 which extends across the boundary of the standard cell 12 and thus, when the cell is lying adjacent to a neighbouring cell it crosses the boundary and actually links with the corresponding poly strip 10 of the neighbouring cell, thereby compensating for any effect due to unintentionally cutting back of the poly in that cell. It should be noted that this additional strip has no functional purpose in the standard cell of 22 but is simply there to mitigate the effect of the non-uniform boundary condition on the neighbouring cell.

Figure 5:
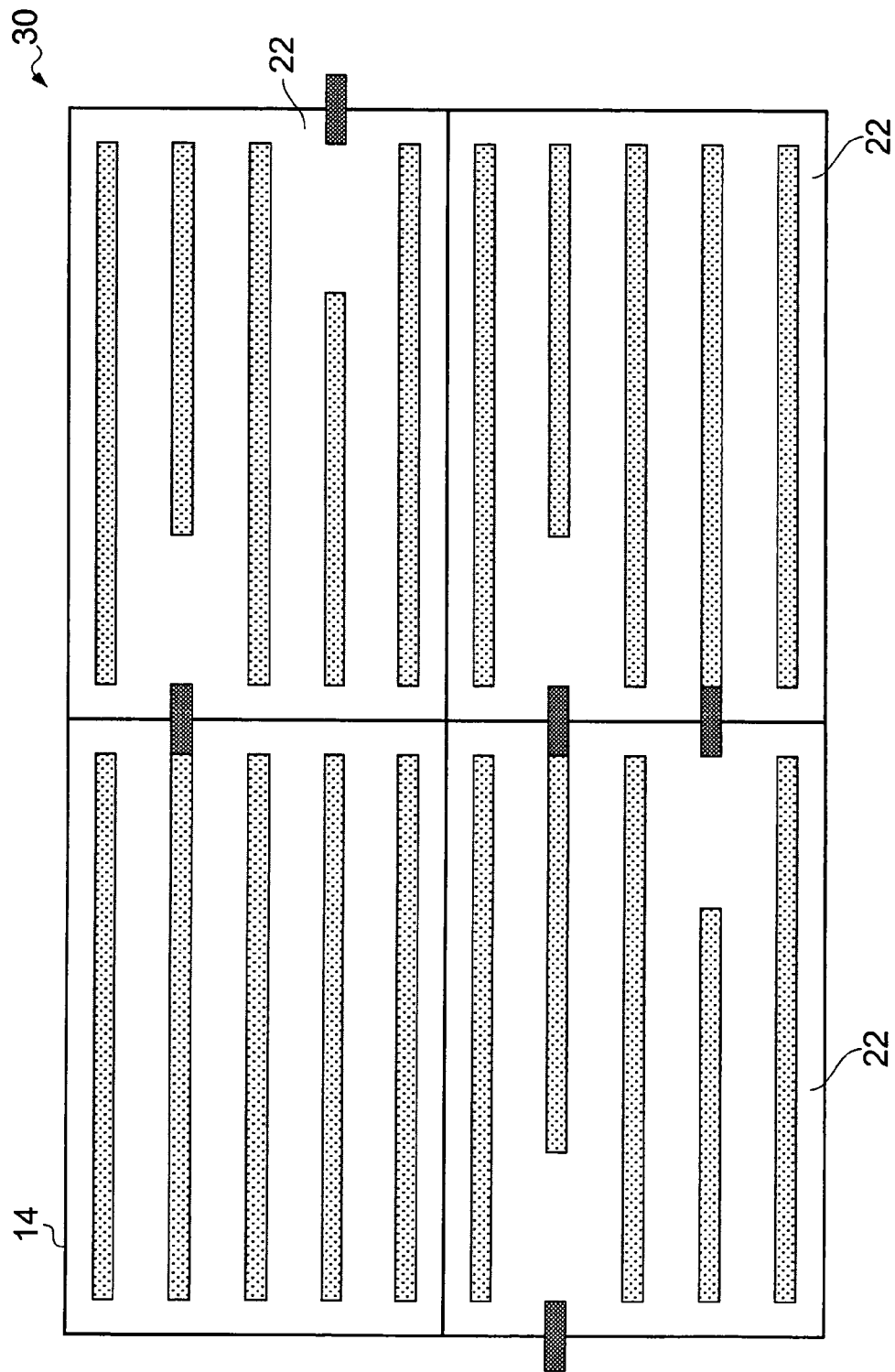
FIG. 5 shows an integrated circuit according to an embodiment of the present invention comprising a plurality of standard cells.

FIG. 5 shows an integrated circuit 30 comprising a plurality of standard cells, three standard cells 22 according to an embodiment of the present invention and a conventional cell 14. As can be seen the additional poly strip in this embodiment extends across the cell boundary into the neighbouring cell, thereby compensating for any unintentionally cut back of the poly strips in the neighbouring cell caused when the shorter poly is cut in the standard cell 22. As can be seen standard cells of embodiments of the present invention can be combined with each other or with conventional uniform cells.

Although the previously described embodiment has been for poly strips, it will be clear to a skilled person that the present technique can be used for any non-uniformity occurring in a boundary condition of a cell, the idea being simply to add a further non-uniformity to that cell to mitigate the effect of the non-uniformity on the adjacent cell.

The integrated circuit of FIG. 5 can be built by combining standard cells according to FIG. 4, for example, that already have their further non-uniformities in place, or it can be built using post placement techniques of an embodiment of the present invention, where the non-uniformities in the boundary condition of the cell are identified after it has been located in its placement site on the integrated circuit and the connecting circuitry has been designed. The additional non-uniformity is then added to mitigate the identified non-uniformity's effect on a neighbouring cell.

Figure 6:
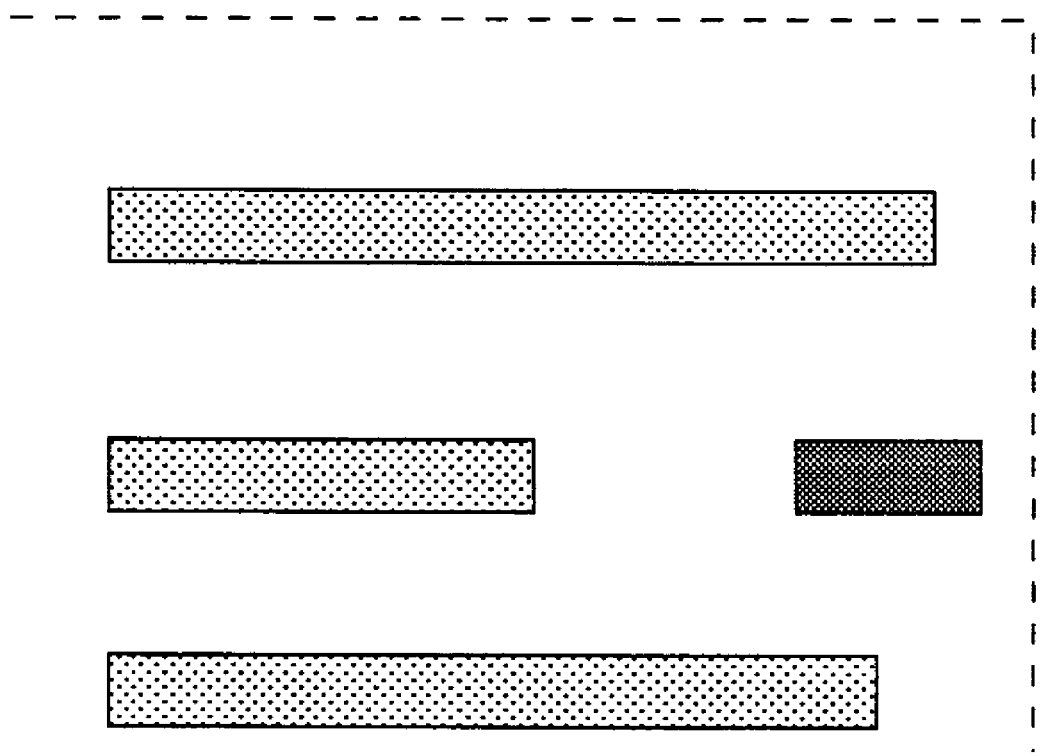
FIG. 6 shows a section of a standard cell according to another embodiment of the present invention.

FIG. 6, for example shows very schematically how non-uniformities in boundary conditions produced by metallisation may be compensated for by adding an additional metallisation strip which in this case does not actually cross the cell boundary but just extends beyond the predetermined distance that strips are usually allowed to extend up to. It should be noted that in this case the strip starts before the predetermined distance but ends after it, but in other embodiments they may start after or at the predetermined distance depending on design criteria.

It should also be noted that standard cells are generally understood to be in the form of a representation of the standard cell which may be held as computer code and is in effect the manufacturing view prior to production of the mask. In this representation of the standard cell hierarchy still exists so that each standard cell is viewed individually. Once the mask is made up this hierarchy is to some extent lost and the individual standard cells are more difficult to see.

A standard cell can be viewed as both the standard cell when it is printed on silicon and also this representation of the standard cell.

Figure 7:
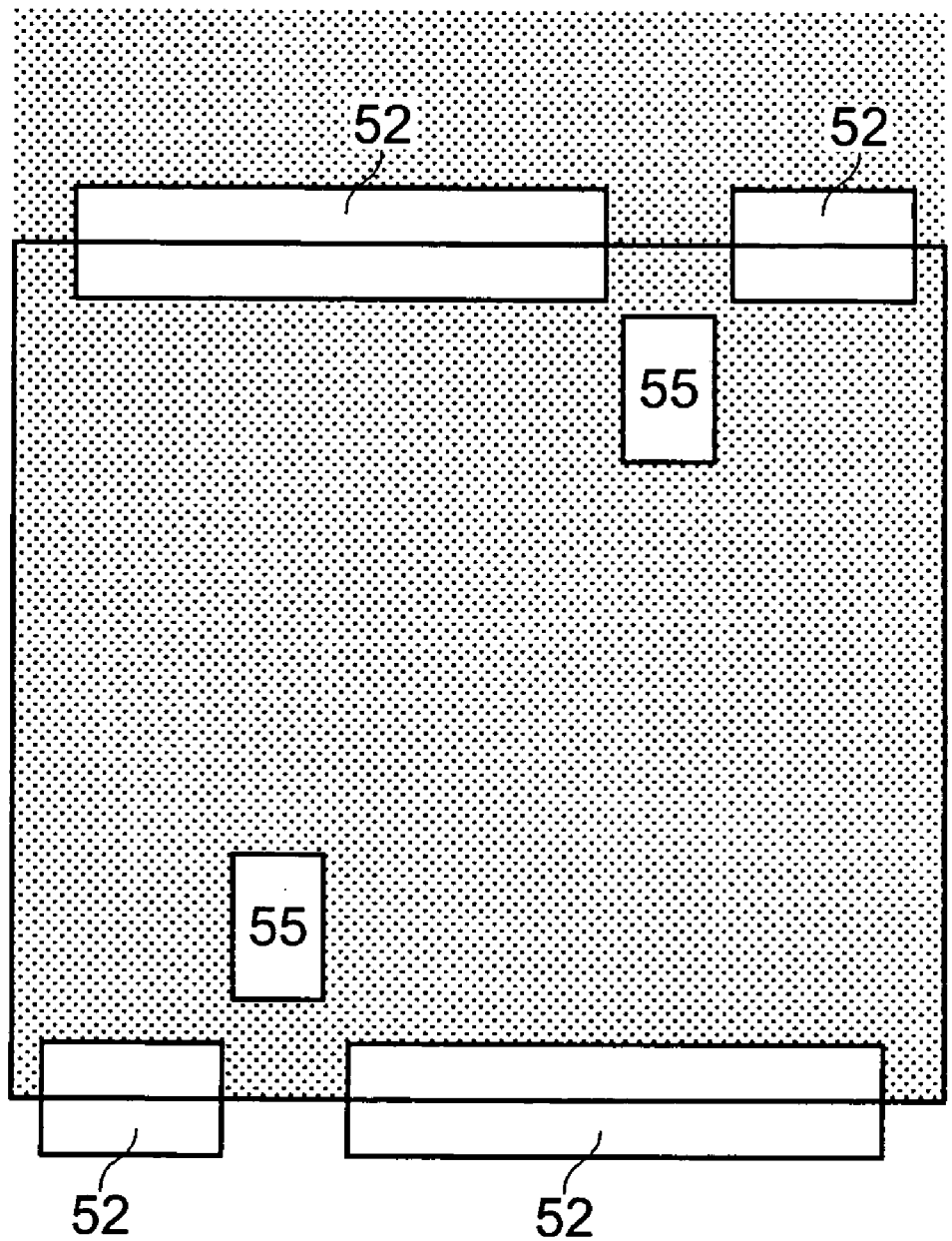
FIG. 7 shows a mask for cutting a pattern of a standard cell according to an embodiment of the present invention.

FIG. 7 shows schematically a section of a cut mask that can be used to generate a standard cell 22 similar to the one shown in FIG. 4, with one end of two poly strips being cut away and additional poly strips being provided at the boundary (by not cutting them) to compensate for the shorter poly strips. The cut features 52 are used to generate the boundary layer between the cells where there are generally no poly strips, while the cut shapes 55 represent the removal of the end of a poly strip to make it shorter than neighbouring poly strips. As can be seen in this diagram the cut shapes 55 stop at a predetermined distance from the boundary of the cell such that the portion of the poly strip that is usually removed from the boundary between the two cells is not removed and extends from this cell across into the next cell. This compensates for the effect that this shorter poly strip has on the neighbouring cell.

Figure 8:
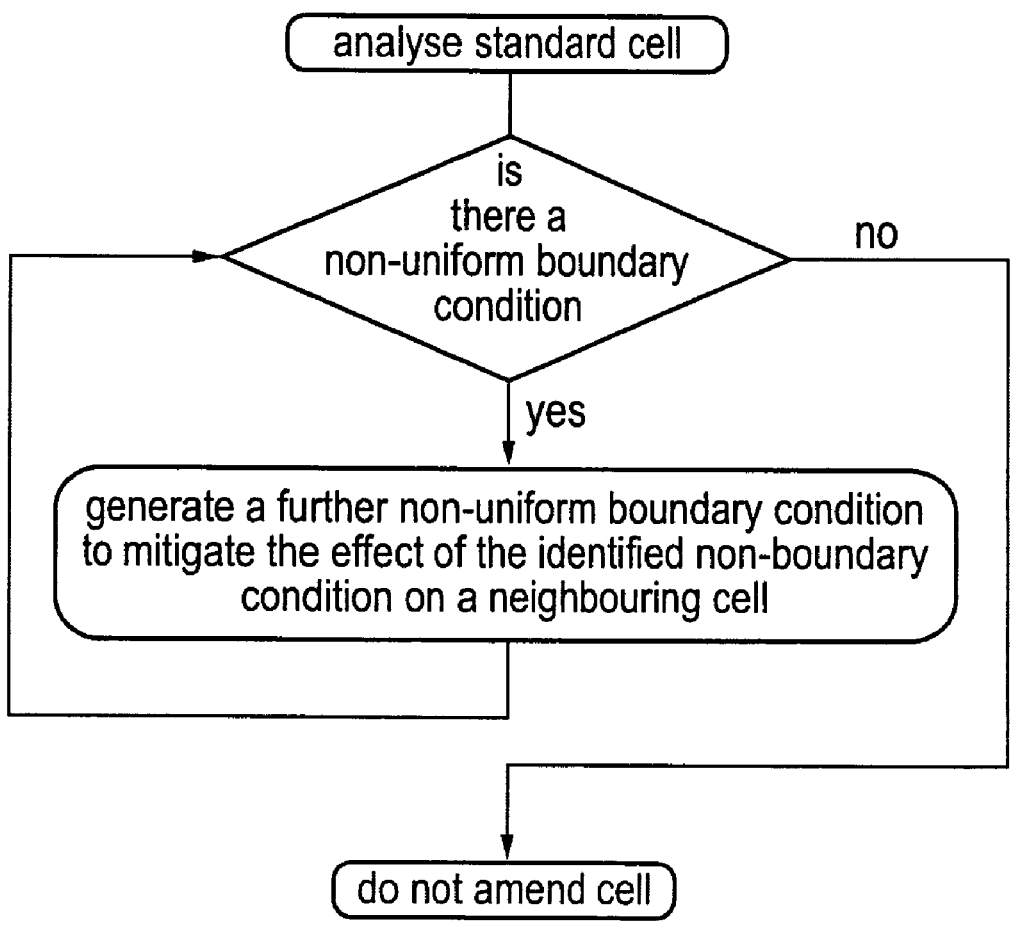
FIG. 8 shows a flow diagram illustrating steps in a method of designing a standard cell according to an embodiment of the present invention.

FIG. 8 shows a flow diagram illustrating a method of design of a standard cell according to an embodiment of the present invention. A first step involves analysing the standard cell and in this analysis it is determined if there is a non-uniform boundary condition present. If one is detected then a further non-uniform boundary condition is generated to mitigate the effect of the detected non-uniform boundary condition on the neighbouring cell. The cell is then analysed to see if there are any other non-uniform boundary conditions and each is addressed by adding a further non-uniform boundary condition to mitigate the effect of the identified non-uniform boundary condition on a neighbouring cell. When no further non-uniform boundary condition is detected then no amendment to the cell is required.

Figure 9:
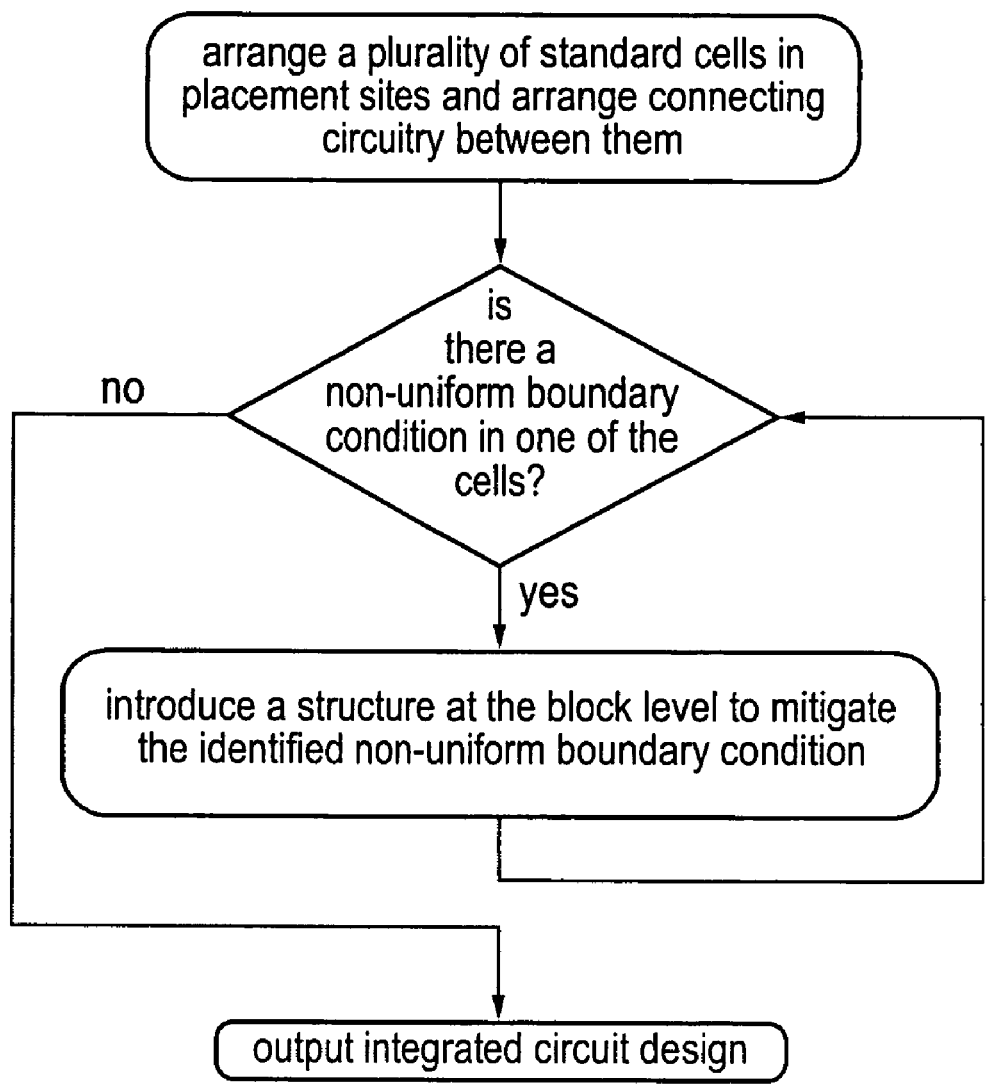
FIG. 9 shows a flow diagram illustrating steps in a method of designing an integrated circuit according to an embodiment of the present invention.

FIG. 9 shows a flow diagram illustrating a method of design of an integrated circuit according to an embodiment of the present invention. A first step comprises arranging a plurality of standard cells in placement sites, and arranging connecting circuitry between them. A next step of identifying a non-uniformity in a boundary condition of at least one of the standard cells that affects a characteristic of a neighbouring standard cell is then performed and then a step of introducing a structure at the block level to mitigate the effect of the identified non-uniform boundary condition on said characteristic of said neighbouring standard cell is performed. This set of steps of identifying non-uniformities and correcting for them is repeated until no more non-uniform boundary conditions are identified. Thus, in this case the non-uniformities are corrected for with the addition of further non-uniformities post placement of the standard cells into their sites on the integrated circuit. Once this has been done the design of the integrated circuit is output. It should be noted that the structure that introduces the further non-uniformities is introduced at the block level, that is at a higher hierarchical level in the design of the integrated circuit than the standard cell level.

It will be clear to the skilled person that although particular embodiments have been described which relate to non-uniform boundary conditions caused by non-uniformities in poly layers or metallisation layers at the boundaries other non-uniform boundary conditions can be compensated for in the same way. For example, it may be that there are contacts or vias along the edge which affect the boundary condition of the cell and a non-uniformity in these such as the removal of a via that is one of a uniform set of vias can be compensated for by the introduction of a further non-uniformity in to this standard cell.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention

We claim:

1. A method of designing a standard cell, said method implemented on a computer, said standard cell comprising a circuit formed of a plurality of layers on a substrate, wherein manufacture of said standard cell comprises use of a plurality of patterned masks each mask creating a separate one of said layers, wherein said method comprises the steps of:
   generating an initial representation of at least one of said masks, wherein said representation comprises a plurality of strips and said strips are arranged in a substantially uniform pattern;
   analyzing said initial representation;
   identifying a non-uniformity in a boundary condition of said initial representation of said standard cell affecting a characteristic of a neighbouring standard cell, said characteristic comprising at least one of electrical performance or cell yield, said non-uniformity comprising a break in said uniform pattern adjacent a boundary of said standard cell; and
   amending said initial representation by introducing a further non-uniformity into said uniform pattern to mitigate the effect of said identified non-uniform boundary condition on said characteristic of said neighbouring standard cell.

2. The method according to claim 1, wherein said further non-uniformity extends over said cell boundary of said cell.

3. The method according to claim 1, said further non-uniformity does not change a logical function of said standard cell.

4. The method according to claim 1, wherein said patterns include a plurality of parallel strips formed from one of said layers, at least some of said strips being arranged to extend to a predetermined distance from one boundary of said standard cell, said step of identifying said non-uniformity comprising identifying at least one shorter strip that does not extend as far as said predetermined distance, and said step of introducing said further non-uniformity comprising introducing at least one additional strip at a position corresponding to said at least one shorter strip such that there is a gap between said at least one shorter strip and said at least one additional strip and said at least one additional strip extends beyond said predetermined distance.

5. The method according to claim 4, wherein said at least one additional strip extends across said boundary of said cell.

6. The method according to claim 1, wherein said pattern includes a plurality of parallel strips formed from one of said layers, said strips being arranged in a substantially uniform pattern, said uniform pattern comprising a plurality of strips located at a same distance from each other and extending to a predetermined distance from one boundary of said standard cell, said substantially uniform pattern comprising at least one gap in said uniform pattern at said predetermined distance from said one boundary, said step of introducing said further non-uniformity comprising introducing at least one additional strip at a position corresponding to said at least one gap, said at least one additional strip extending beyond said predetermined distance.

7. The method of design according to claim 6, wherein said at least one additional strip extends across said boundary of said cell.

8. The method according to claim 7, wherein said at least one gap corresponds to at least one of there being no strip and there being a shorter strip that does not extend to said predetermined distance from said boundary of said cell.

9. The method according to claim 1, wherein said method of manufacture comprises a double patterning technique involving two masks per layer.

10. The method according to claim 9, wherein said first mask comprises a mask for drawing layers and said second mask comprises a mask for cutting portions of said layers.

11. The method according to claim 9, wherein said first mask comprises a mask for drawing layers and said second mask comprises a mask for drawing layers, said masks having different shapes to generate said overall final pattern.

12. The method according to claim 1, wherein said one of said layers are poly layers.

13. The method according to claim 1, wherein said one of said layers are at least one of diffusion, contact, via layers and metallisation layers.

14. The method according to claim 1, wherein said step of introducing said further non-uniformity into said cell comprises adding structure to said cell to mitigate its effect on said neighbouring cell.

15. The method according to claim 1, wherein said step of introducing said further non-uniformity does not substantially affect a characteristic of said cell.

16. A standard cell generated from a design according to claim 1.

17. A standard cell comprising a circuit, said circuit comprised of a plurality of layers on a substrate, each layer including a plurality of strips arranged in a substantially uniform pattern, at least two features of said pattern each generating non-uniform boundary conditions, said non-uniform boundary conditions comprising a break in said uniform pattern adjacent a boundary of said cell, wherein at least one of said non-uniform boundary conditions mitigating an effect on at least one of yield or electrical performance of a neighbouring standard cell of the other of said at least two non-uniform boundary conditions.

18. The standard cell according to claim 17, wherein said feature generating said further non-uniformity extends over said cell boundary of said cell.

19. The standard cell according to claim 17, wherein said feature generating said further non-uniformity does not change a structure of said cell that relates to its function.

20. The standard cell according to claim 17, wherein said pattern includes a plurality of parallel strips formed from one of said layers, at least some of said strips being arranged to extend to a predetermined distance from one boundary of said standard cell and at least one shorter strip that does not extend as far as said predetermined distance, and a corresponding at least one additional strip arranged at a position corresponding to said at least one shorter strip such that there is a gap between said at least one shorter strip and said at least one additional strip extends beyond said predetermined distance.

21. The standard cell according to claim 20, wherein said at least one additional strip extends across said boundary of said cell.

22. The standard cell according to claim 17, wherein said pattern includes a plurality of strips formed from one of said layers, said strips being arranged in a substantially uniform pattern, said uniform pattern comprising a plurality of strips located at a same distance from each other and extending to a predetermined distance from one boundary of said standard cell, said substantially uniform pattern comprising at least one gap in said uniform pattern at said predetermined distance from said one boundary, said standard cell comprising an additional strip located at a position corresponding to said at least one gap said additional strip extending beyond said predetermined distance.

23. The standard cell according to claim 22, wherein said additional strip extends across said boundary.

24. The standard cell according to claim 22, wherein said at least one gap corresponds to at least one of there being no strip and there being a shorter strip that does not extend to said predetermined distance from said boundary of said cell.

25. The standard cell according to claim 23, wherein said additional strip extends from a point between said predetermined distance and said cell boundary to a point beyond said standard cell boundary.

26. The standard cell according to claim 23, wherein said additional strip extends from a point before said predetermined distance to a point beyond said standard cell boundary.

27. The standard cell according to claim 18, wherein said pattern comprises a plurality of strips, said plurality of strips being formed from poly.

28. The standard cell according to claim 18, wherein said pattern comprises a plurality of strips, said plurality of strips being formed from at least one of diffusion, contact, via layers and metallisation layers.

29. An integrated circuit comprising a plurality of standard cells arranged in standard cell placement sites to form a logical system, at least one of said standard cells comprising a standard cell according to claim 17.

30. A computer program product comprised of a non-transitory computer readable storage medium storing a computer program code which, when implemented on a computer, performs the steps of the method of claim 1.

31. A method of designing an integrated circuit, said method implement on a computer, said integrated circuit comprising a plurality of standard cells, each standard cell comprising a circuit formed of a plurality of layers on a substrate, wherein manufacture of said standard cell comprises use of a plurality of patterned masks each mask creating a separate one of said layers, said method comprising the steps of:

generating an initial representation of at least one of said masks comprising said plurality of standard cells arranged in placement sites with connecting circuitry to connect them, wherein said representation comprises a plurality of strips and said strips are arranged in a substantially uniform pattern;

analyzing said initial representation to identify a non-uniformity in a boundary condition of at least one of said standard cells that affects a characteristic of a neighbouring standard cell; and generating said integrated circuits by amending said initial representation to introduce a further non-uniformity at the block level to mitigate the effect of said identified non-uniform boundary condition on said characteristic of said neighbouring standard cell.

* * * * *